March 2, 1965

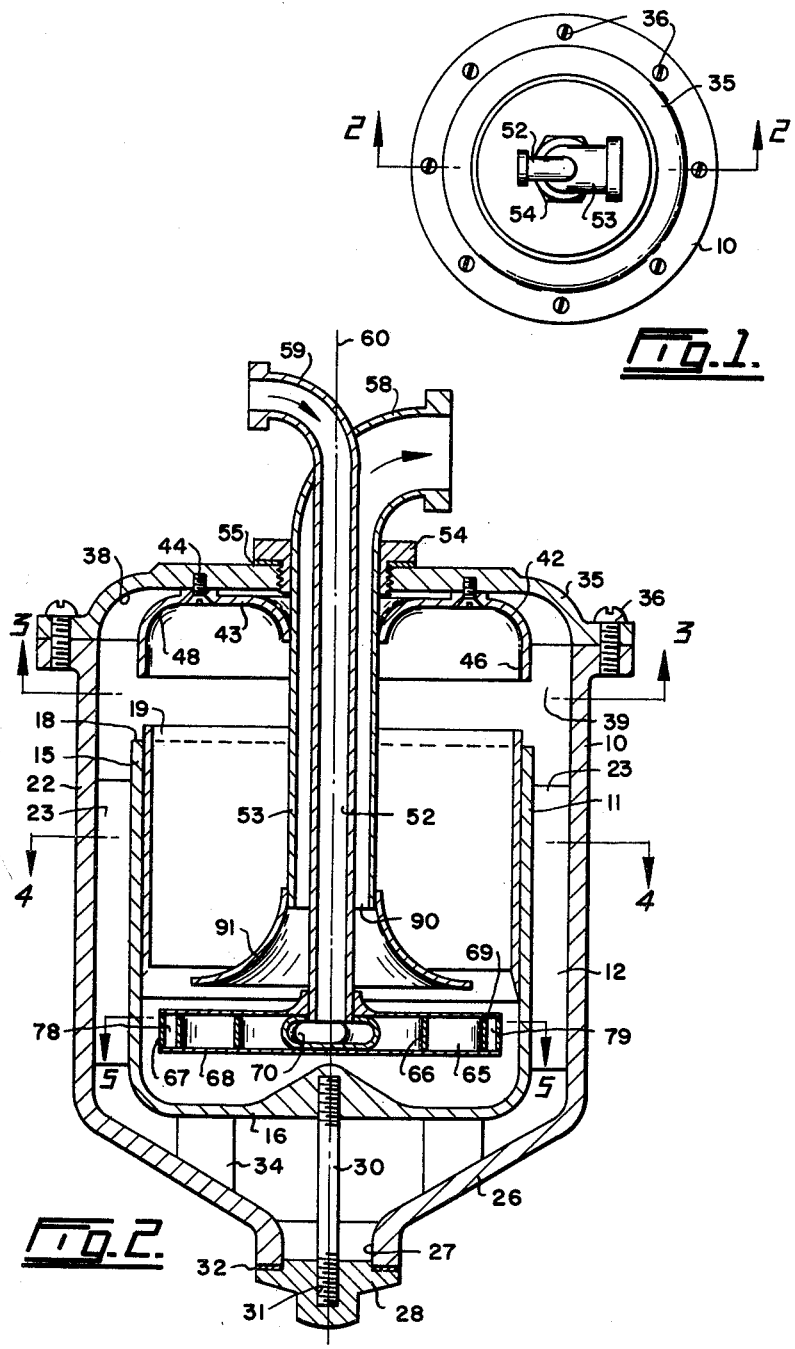

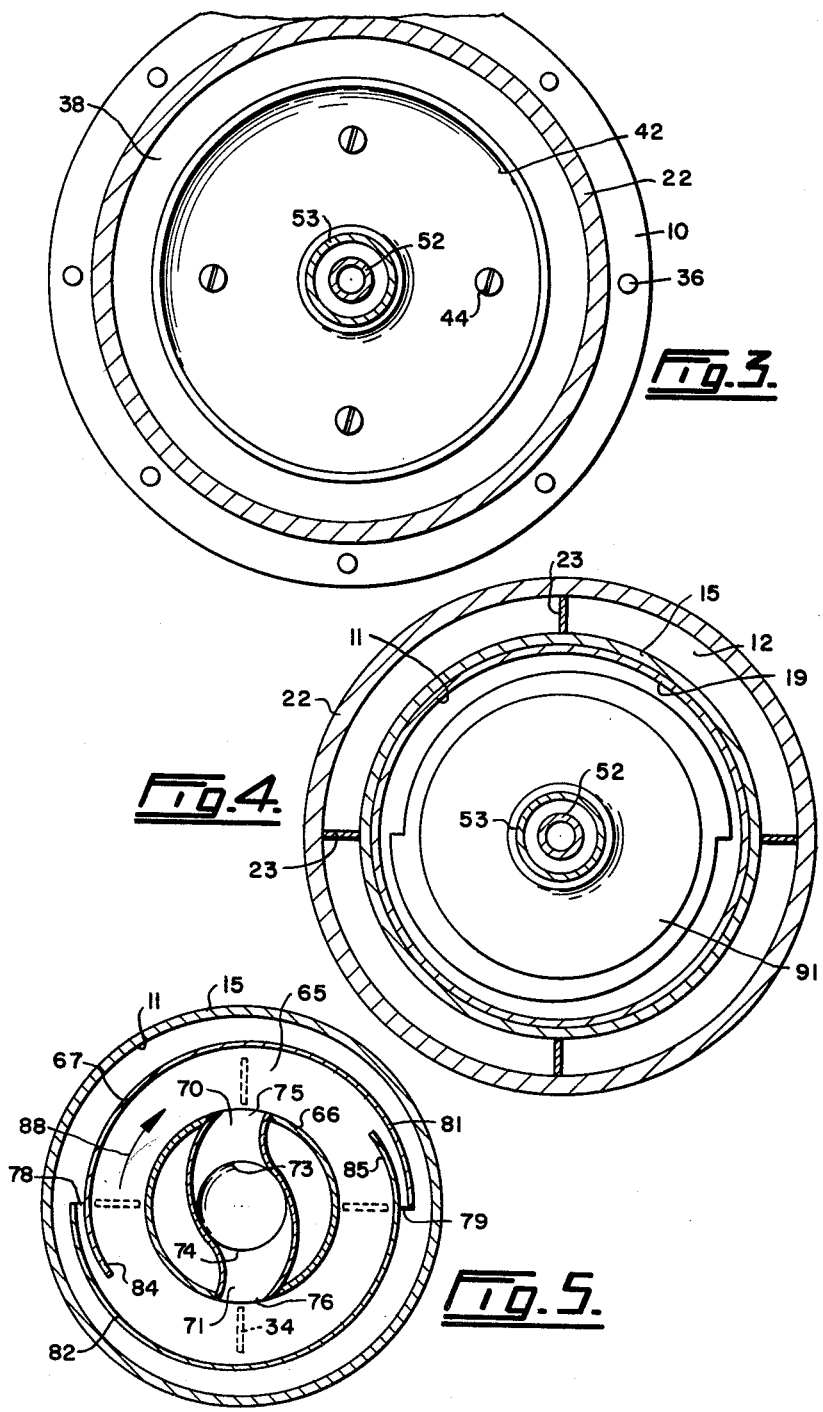

G. E. NEUMAN 3,171,807

LIQUID SEPARATING APPARATUS

Filed Aug. 22, 1960

INVENTOR
GEORGE E. NEUMAN
BY
Fetherstonhaugh & Co.
ATTORNEYS

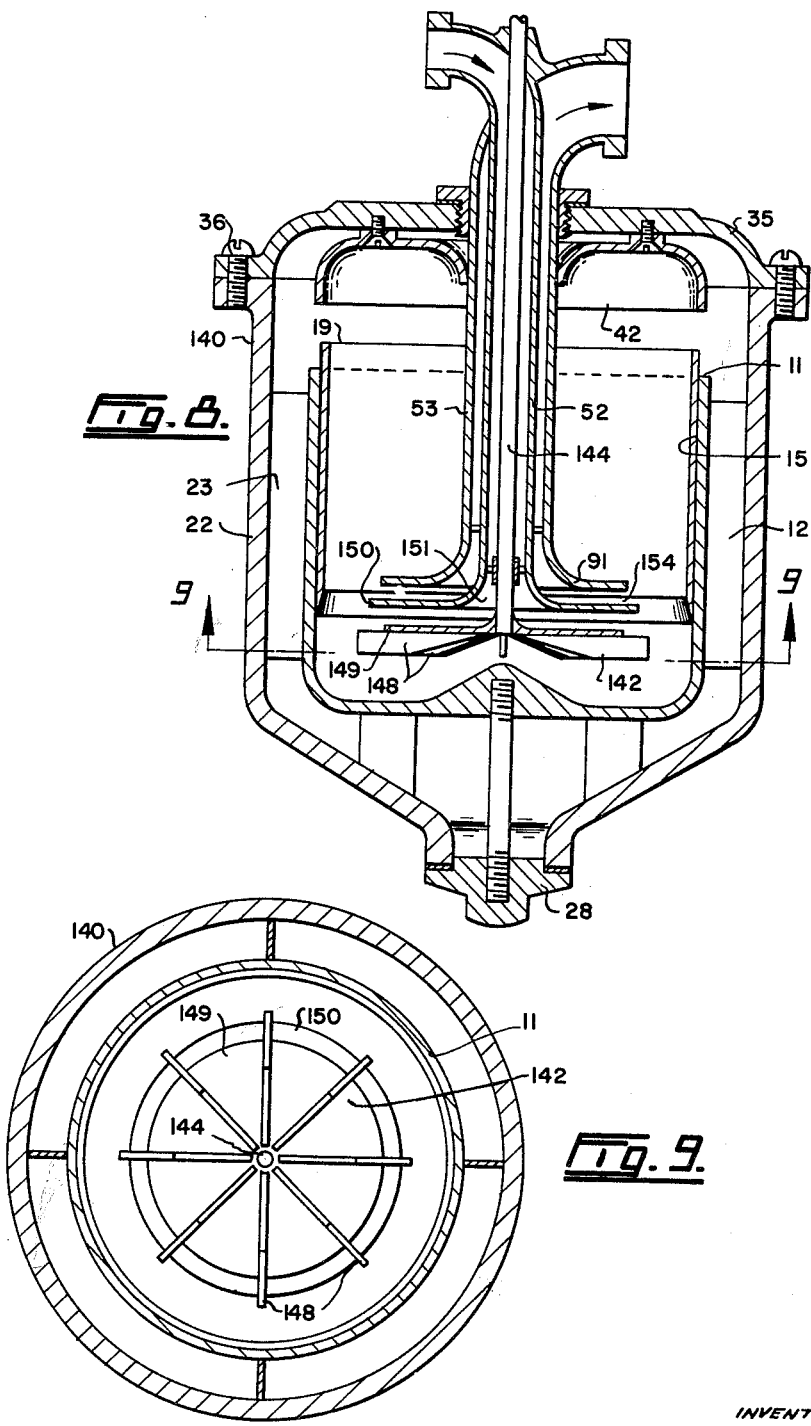

United States Patent Office 3,171,807
Patented Mar. 2, 1965

3,171,807
LIQUID SEPARATING APPARATUS
George E. Neuman, South Burnaby, British Columbia, Canada, assignor to Neuman Enterprises Limited, Nassau, Bahama Islands, a corporation of the Bahamas
Filed Aug. 22, 1960, Ser. No. 51,228
20 Claims. (Cl. 210—319)

This invention relates to apparatus for separating from a fluid impurities of a higher specific gravity than that of the fluid. More particularly, it relates to the separation of solids from liquids, and the separation of liquids of different specific gravities.

An object of the present invention is the provision of a separator for fluids which does not include screens, filter material, and the like, and therefore does not materially reduce the speed of the fluid when the separator is used in a closed system, or require more power to maintain a desired speed.

Another object is the provision of a centrifugal separator for removing dirt from a flowing liquid, such as in a circulating system, and in which the liquid is not continuously moving in contact with the dirt.

A further object is the provision of liquid separating apparatus which may be used in a closed system without losing any appreciable amount of the liquid.

This apparatus may be used for separating impurities from moving liquids in any desired situation. For example, it may be used as a filter or separator for the base oil of an internal combustion engine, in which case the oil is continuously pumped through the separator. This separator produces little if any resistance to the flow of oil so that the impurities or heavy particles are continuously removed therefrom without affecting the circulation of the oil. As another example, the unit may be used for separating sand and mud from water before the water passes through a pump. In either case and in any other situations, the separator operates continuously, and the impurities are accumulated in the separator and periodically removed therefrom, and yet the main body of the circulating liquid does not come into contact with the accumulated impurities.

Separating apparatus according to the present invention includes a chamber having a substantially cylindrical wall, a bottom and an opening at the top of said wall. Liquid with impurities therein is delivered to this chamber near the bottom thereof. The separator includes means for imparting to this liquid a rotary motion within the chamber around a vertical axis thereof, the rotation of the liquid in the chamber causing the heavy impurities under centrifugal force to move outwardly to the wall and up the latter to and through the opening at the top thereof. Means is provided for removing liquid from the chamber near the vertical axis thereof. Thus, the liquid continuously flows into and out of the chamber while the impurities are discharged therefrom. In the preferred form of the invention, the chamber is located in a closed settling tank. This tank remains full of the liquid which flows through the chamber, and the impurities separated from the liquid and moving out through the opening at the top of the chamber drop downwardly in the settling tank. This prevents any loss of liquid during normal operation of the separator. The tank has a normally-closed outlet near the bottom thereof through which the impurities may be removed.

Examples of this invention are illustrated in the accompanying drawings, in which:

FIGURE 1 is a plan view of a preferred form of separator.

FIGURE 2 is a vertical section taken on the line 2—2 of FIGURE 1.

FIGURE 3 is a cross section taken on the line 3—3 of FIGURE 2.

FIGURE 4 is another cross section taken on the line 4—4 of FIGURE 2.

FIGURE 5 is still another cross section taken on the line 5—5 of FIGURE 2.

FIGURE 8 is a vertical section through another alternative form of separator, and FIGURE 9 is a section taken on the line 9—9 of FIGURE 8.

Figure 6:
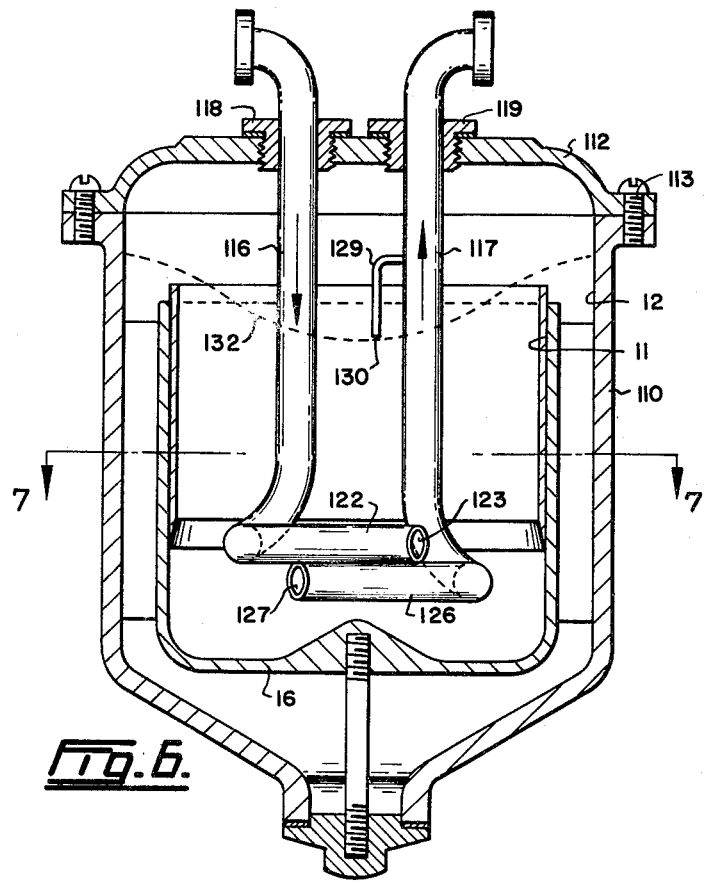
FIGURE 6 is a vertical section similar to FIGURE 2 through an alternative form of separator.

Referring to FIGURES 1 to 5 of the drawings, 10 is a separator including a separating chamber 11 mounted within an outer settling tank 12. Chamber 11 consists of a substantially cylindrical wall 15 and a bottom 16 at the lower end of said wall. This chamber is completely open at its upper end at 18, although it may have a cover thereon with one or more outlet openings located at the upper edge of wall 15. If desired, a sleeve 19 may slidably fit within wall 15 for adjusting the effective height of said wall.

Chamber 11 is mounted within tank 12 in any desired manner. It is preferable, however, to position the chamber so that wall 15 is spaced from and substantially concentric with wall 22 of the tank. It is desirable to provide a plurality of spaced vertical baffles 23 between walls 15 and 22. These baffles may be secured to the walls in any convenient manner, such as by welding, so that they help support chamber 11 within the settling tank. The illustrated tank is provided with a conical bottom 26 having an outlet 27 therein centrally thereof. A plug 28 is provided for outlet 27, and is held therein in any desired manner. In this example, a rod 30 is threaded into bottom 16 of chamber 11 centrally thereof, and projects downwardly into and through outlet 27. Plug 28 has an internally-threaded hole 31 therein for receiving the threaded lower end of rod 30. Thus, when plug or cap 28 is threaded onto rod 30, it is drawn into outlet 27 and against a gasket 32 surrounding said outlet. If desired, a plurality of bottom baffles or vanes 34 may be provided between bottoms 16 and 26, said baffles or vanes helping to support chamber 11 within tank 12.

The upper end of tank 12 is closed by a cover 35 removably held thereon by bolts 36. This cover is internally coved at 38, said cove being located over the top of the annular space 39 between chamber and tank walls 15 and 22. If desired, a hood 42 may be provided over but spaced from the upper end of tank wall 15, as shown in FIGURE 2. This hood may be used with or in place of cove 38. Hood 42 has a top 43 secured to the inner surface of cover 35 by bolts 44, and a depending annular wall 46 which is substantially aligned with wall 15. Hood 42 is preferably internally coved at 48.

Concentric inlet and outlet pipes 52 and 53 extend through cover 35 and hood 42 centrally thereof. Pipe 52 extends centrally through pipe 53, and the latter extends through a large nut 54 threaded into the cover, said nut being adapted to be tightened down against a gasket 55 to provide a seal around the opening in the cover. Pipe 53 curves laterally at 58 at its upper end, while pipe 52 extends through the wall of pipe 53 above cover 34 and terminates in a curved section 59. Pipe 52 forms an inlet for chamber 11, while pipe 53 is an outlet therefor.

Liquid containing the impurities to be separated therefrom is pumped into the separator through pipe 52. Means is provided in chamber 11 near the bottom thereof for imparting a rotary motion to the liquid within the chamber around the central vertical axis thereof, indicated by line 60. In this example, the means for imparting a rotary motion to the liquid comprises an annular chamber 65 having spaced substantial concentric inner and outer walls 66 and 67, a bottom 68 and a top 69. Means is provided for directing liquid from inlet pipe 52 into chamber 65 in such a way as to cause said liquid to flow around said chamber. The lower end of pipe 52 extends through top 69 and communicates with one or more curved and radiating passages which extend to chamber 65. In this example, there are two of these curved radiating passages 70 and 71. Passages 70 and 71 have inlets 73 and 74 at their inner ends communicating with pipe 53, and outlets 75 and 76, respectively, opening into chamber 65, preferably in diametrically opposite directions, as shown in FIGURE 5. This chamber is also provided with one or more openings in the peripheral wall 67 thereof through which liquid and impurities are tangentially discharged into chamber 11. In this example, two openings 78 and 79 are provided for this purpose, said openings preferably being spaced from outlets 75 and 76. It will be noted that peripheral wall 67 is formed in substantially semi-circular sections 81 and 82 which are offset relative to each other in order to provide openings 78 and 79 between the adjacent ends thereof. Wall section 81 forms a baffle 84 near and leading towards opening 78, while section 82 forms a baffle 85 near and leading to opening 79.

By referring to FIGURE 2, it will be noted that annular chamber 65 and its associated elements are near and spaced above bottom 16 of chamber 11, these elements being connected to and supported by pipe 52. Thus, liquid pumped into the apparatus through pipe 52 is directed into annular chamber 65 through passages 70 and 71 in such a manner as to cause the liquid to flow along a circular path indicated by arrow 88 in FIGURE 5. Centrifugal force sends the liquid and the impurities therein to the outer annular wall 67 so that they are directed out of the chamber through openings 78 and 79 into separating chamber 11. As the liquid with its impurities is discharged into the separating chamber tangentially from annular chamber 65, the liquid and impurities swirl around the vertical axis 60 of the separating chamber. The liquid has to rise in chamber 11 and it overflows from said chamber into tank 12. Centrifugal force causes the impurities of higher specific gravity than the liquid to move out against wall 15, sleeve 19, if used, actually forming part of said wall. The impurities as they swirl around the separating chamber wall move up the latter to and out through the open upper end of the separating chamber. Any lighter impurities that are carried upwardly by the liquid flow into hood 42. As the upward velocity of the liquid is checked within this hood, these impurities tend to drop downwardly and are eventually washed laterally by the flow of liquid into tank 12. As the velocity of the liquid drops sharply in the settling tank, the comparatively heavy impurities drop downwardly in said tank. Baffles 23 check any rotary motion of the liquid in the settling tank so that the impurities drop comparatively rapidly downwardly in the tank, and accumulate in the conical bottom 26 thereof to be periodically removed therefrom through outlet 27. If hood 42 is omitted, cover 35 acts in the same manner as the hood.

Outlet pipe 53 has an open lower end 90 located at the vertical axis 60 of separating chamber 11. This open end is preferably located just above the top 69 of annular chamber 65. It has been found advantageous to provide an entrance funnel 91 at pipe end 90 and extending downwardly and opening out over top 69. Thus, pipe 53 gathers liquid from the centre of separating chamber 11 where said liquid is the cleanest owing to the outward movement of the impurities under the action of centrifugal force. The upper surface of funnel 91 acts as a deflector so that any impurities still in the liquid moving downwardly centrally of the chamber are deflected towards the chamber wall into the upwardly-moving liquid.

During operation of separator 10, liquid rotates at high speed around the vertical axis 60 within chamber 11 causing the impurities to move up wall 15 and out through the opening at the top of said chamber. The effective height of wall 15 may be adjusted to suit the impurities being separated by means of sleeve 19. Tank 12 holds a comparatively quiet pond of the liquid so that the impurities rapidly settle therein, after which they are not affected by the movement of liquid through the apparatus. It is obvious that the liquid moves continuously into the apparatus through pipe 52 and out through pipe 53, and as there is very little opposition to the natural movement of the liquid, it can be maintained at a desired speed in a closed system. If some loss of liquid is not objectionable, settling tank 12 may be omitted. In this case, the impurities are discharged over the top of the separating wall and out of the apparatus.

Figure 7:
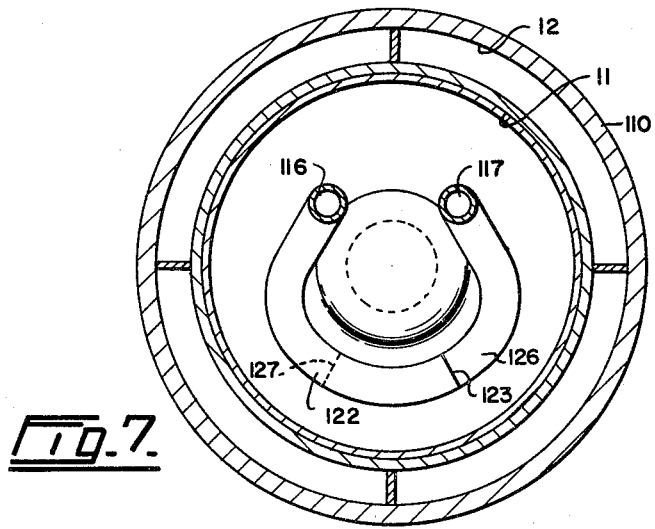
FIGURE 7 is a cross section taken on the line 7—7 of FIGURE 6.

FIGURES 6 and 7 illustrate a separator 110 which is the same as separator 10, excepting that it includes different means for imparting a rotary motion to the liquid within separating chamber 11. Chamber 11 is mounted within tank 12. This tank has a different cover 112 that is removably connected to the top of tank 12 by means of bolts 113. Hood 42 has been omitted.

Inlet and outlet pipes 116 and 117 extend through packing nuts 118 and 119 in cover 12 and down into chamber 11, and terminate just above the bottom 16 thereof. The means for imparting a circular motion to the liquid in chamber 11 consists of a pipe 122 extending in substantially a circle from the lower end of pipe 116 approximately concentric with chamber wall 15. This circular pipe has an open end 123 through which the liquid containing impurities is discharged into chamber 11. Another pipe 126 extends in substantially a circle from the lower end of outlet pipe 117 and approximately concentric with chamber wall 15, said pipe 126 having an open end 127. It will be noted that the open ends 123 and 127 are spaced and face away from each other, as clearly shown in FIGURE 7. If desired, a small tube 129 may extend from outlet pipe 117 down in separating chamber 11 to a desired point 130.

Separator 110 operates substantially in the same manner as separator 10. Liquid with impurities therein is directed through inlet pipe 116 into separating chamber 11 near the bottom thereof. Curved pipe 122 imparts a rotary motion to the liquid within the separating chamber. The impurities under the action of centrifugal force are thrown out to wall 15 and move upwardly along said wall. During operation, the surface of the liquid drops at the centre and rises towards the wall of tank 12, as indicated by broken line 132 in FIGURE 6. Tube 129 determines the depth of the liquid at the centre of chamber 11 when the apparatus is in operation. The heavier impurities spill over the top of the separating chamber and drop down into the bottom of settling tank 12, if the latter issued. Liquid is removed from adjacent the centre of chamber 11 through pipe 117.

FIGURES 8 and 9 illustrate still another alternative separator 140. It is the same as separator 10, excepting that it includes a different means for imparting a rotary motion to the liquid in separating chamber 11.

In place of the annular chamber 65 and its associated elements, there is an impeller 142 positioned beneath funnel 91. The impeller is mounted on the lower end of a shaft 144 extending upwardly through inlet pipe 52 and out through the top thereof, said shaft being rotated by a suitable source of power, such as an electric motor, not shown.

Impeller 142 consists of a plurality of blades 148 radiating from a central hub and secured to the undersurface of a disc 149, said blades projecting beyond the periphery of the disc. If desired, the disc may be omitted. A shield 150 lies between funnel 91 and impeller 142, and is connected to the lower end of pipe 52. This shield has an opening 151 centrally thereof in communication with the interior of the inlet pipe.

Separator 140 operates generally in the same manner as the other separators. The liquid containing impurities is directed into separating chamber 11 through inlet pipe 52. This liquid is directed downwardly on top of impeller 142 which is rotated at a suitable speed, and the impeller imparts a rotary motion to this liquid which causes the heavy impurities to move outwardly to wall 15 of the chamber, and upwardly along said wall to spill out of the top of the chamber over the upper edge of said wall. These impurities then settle to the bottom of tank 12, if said tank is used. The separated liquid enters space 154 between shield 150 and funnel 91, whence it passes upwardly through outlet pipe 53.

What I claim as my invention is:

1. Apparatus for separating from a fluid impurities of a higher specific gravity than that of the fluid, comprising a closed outer settling tank; a separating chamber in the tank and having a substantially cylindrical wall, a closed bottom and an opening at the top of said wall; means for delivering fluid with impurities therein to the lower portion of the chamber near the bottom thereof; means in the lower portion of the chamber near the chamber bottom for imparting to the fluid being delivered a rotary motion within the chamber around a vertical axis thereof to cause said fluid to spiral upwardly in the chamber along said cylindrical wall, the rotation of the fluid in the chamber causing the heavy impurities under centrifugal force to move outwardly to the cylindrical wall and up the latter to and out through the opening at the top thereof, said chamber being so located in the tank that said impurities moving out through the opening at the top thereof can drop downwardly in the tank; and means in the lower portion of the chamber near the rotary motion imparting means for removing fluid from the chamber near said vertical axis and out of the apparatus, whereby the fluid after moving upwardly near the chamber wall flows downwardly centrally of the chamber to said removing means in the lower portion of the chamber.

2. Separating apparatus as claimed in claim 1 in which the means for imparting a rotary motion to the fluid comprises an annular chamber within the lower portion of the separating chamber and having an outer peripheral wall, means for directing fluid from the fluid delivering means to said annular chamber to cause fluid to flow around the latter, and an opening in the peripheral wall through which the fluid and impurities are tangentially discharged into the separating chamber.

3. Separating apparatus as claimed in claim 1 in which the means for imparting a rotary motion to the fluid comprises an annular chamber within the lower portion of the separating chamber and having inner and outer peripheral walls, means for directing fluid from the fluid delivering means to said annular chamber through the inner wall thereof to cause said fluid to flow around the annular chamber, and an opening in the outer peripheral wall spaced from the opening in the inner wall and through which the fluid and impurities are tangentially discharged into the separating chamber.

4. Separating apparatus as claimed in claim 1 in which the fluid removing means includes a downwardly-opening funnel in the lower portion of the separating chamber above the rotary motion imparting means thereof.

5. Separating apparatus as claimed in claim 1 in which the means for imparting a rotary motion to the fluid comprises a pipe extending from the fluid delivering means in substantially a circle approximately concentric with the separating chamber wall and terminating in an open end; and the fluid removing means includes a pipe in the chamber extending in substantially a circle approximately concentric with the chamber wall and terminating in an open end; the open ends of the two circular pipes being spaced apart and facing away from each other.

6. Separating apparatus as claimed in claim 1 in which the means for imparting a rotary motion to the fluid comprises an impeller mounted for rotation near the bottom of the chamber and positioned to receive fluid from the fluid delivering means.

7. Apparatus for separating from a fluid impurities of a higher specific gravity than that of the fluid, comprising a chamber having a substantially cylindrical wall, a closed bottom and an opening at the top of said wall, means for delivering fluid with impurities therein to the lower portion of the chamber near the bottom thereof, means in the lower portion of the chamber near the chamber bottom for imparting to the fluid being delivered a rotary motion within the chamber near the bottom and around a vertical axis thereof to cause said fluid to spiral upwardly in the chamber along said cylindrical wall, the rotation of the fluid in the chamber causing the heavy impurities under centrifugal force to move outwardly to the cylindrical wall and up the latter to and out through the opening at the top thereof, means in the lower portion of the chamber near the rotary motion imparting means for removing fluid from said chamber near said vertical axis, and means above the chamber wall for directing fluid moving upwardly from said chamber back down adjacent the vertical axis thereof, whereby the fluid after moving upwardly near the chamber wall flows downwardly centrally of the chamber to said removing means in the lower portion of the chamber.

8. Apparatus for separating from a fluid impurities of a higher specific gravity than that of the fluid, comprising a closed outer settling tank; a separating chamber in the tank and having a substantially cylindrical wall; a closed bottom and an opening at the top of said wall; means for delivering fluid with impurities therein to the lower portion of the chamber near the bottom thereof, means in the lower portion of the chamber near the chamber bottom for imparting to the fluid being delivered a rotary motion within the chamber near the bottom and around a vetrical axis thereof to cause said fluid to spiral upwardly in the chamber along said cylindrical wall, the rotation of the fluid in the chamber causing the heavy impurities under centrifugal force to move outwardly to the cylindrical wall and up the latter to and out through the opening at the top thereof, said chamber being so located in the tank that said impurities moving out through the opening at the top thereof can drop downwardly in the tank, means in the lower portion of the chamber near the rotary motion imparting means for removing fluid from said chamber near said vertical axis, and means above the chamber wall for directing fluid moving upwardly from said chamber back down adjacent the vertical axis thereof, whereby the fluid after moving upwardly near the chamber wall flows downwardly centrally of the chamber to said removing means in the lower portion of the chamber.

9. Separating apparatus as claimed in claim 8 including baffle means between the liquid delivery means and the top of the chamber for directing liquid outwardly towards the chamber wall.

10. Apparatus for separating from a fluid impurities of a higher specific gravity than that of the fluid, comprising a settling tank having a wall, a bottom and a cover on said wall; a separating chamber within and spaced from the wall and bottom of the tank, said chamber having a closed bottom and a substantially cylindrical wall extending upwardly from the latter bottom and terminating below the tank cover; an inlet pipe extending downwardly of the tank and into the lower portion of the chamber centrally thereof and towards the bottom of said chamber, said pipe being adapted to deliver fluid with impurities therein to the lower portion of the chamber near the bottom thereof; means for imparting to the fluid being delivered a rotary motion within the chamber around a vertical axis thereof, the rotation of the fluid in the chamber causing the heavy impurities under centrifugal force to move outwardly to the chamber wall and up the latter to and out through the top of the chamber, said impurities dropping downwardly in the tank; and an outlet pipe extending downwardly of the tank and downwardly in the lower portion of the chamber centrally thereof for removing fluid from the chamber near the rotary motion imparting means and said vertical axis and out of the apparatus.

11. Apparatus for separating from a fluid impurities of a higher specific gravity than that of the fluid, comprising a settling tank having a wall, a bottom and a cover on said wall; a separating chamber within and spaced from the wall and bottom of the tank, said chamber having a closed bottom and a substantially cylindrical wall extending upwardly from the latter bottom and terminating below the tank cover; an inlet pipe extending downwardly of the tank and into the lower portion of the chamber centrally thereof and towards the bottom of said chamber; an annular chamber within the lower portion of the separating chamber and having an outer peripheral wall, said annular chamber communicating with the inlet pipe, said pipe being adapted to deliver fluid with impurities therein to the annular chamber to cause said fluid to flow around the latter, an opening in the peripheral wall through which the fluid and impurities are tangentially discharged into the separating chamber to flow around a vertical axis thereof, the rotary flow of the fluid in the separating chamber causing the heavy impurities under centrifugal force to move outwardly to the chamber wall and up the latter to and out through the top of the chamber, said impurities dropping downwardly in the tank; and an outlet pipe extending downwardly of the tank and downwardly in the chamber centrally thereof for removing liquid from the lower portion of the separating chamber near the annular chamber and said vertical axis ad out of the apparatus.

12. Separating apparatus as claimed in claim 11 in which the outlet pipe terminates above the inlet pipe, and including an entrance funnel at the outlet pipe end extending downwardly and opening above the annular chamber.

13. Separating apparatus as claimed in claim 11 including a hood carried by the tank cover above the separating chamber and having a depending annular flange substantially aligned with the separating chamber wall.

14. Apparatus for separating from a fluid impurities of a higher specific gravity than that of the fluid, comprising a settling tank having a wall, a bottom and a cover on said wall, a separating chamber within and spaced from the wall and bottom of the tank, said chamber having a closed bottom and a substantially cylindrical wall extending upwardly from the latter bottom and terminating below the tank cover, an inlet pipe extending downwardly of the tank, and into the lower portion of the chamber centrally thereof and towards the bottom of said chamber for delivering fluid with impurities therein to the lower portion of the chamber near the bottom thereof, an impeller mounted for rotation beneath said inlet pipe and near the bottom of the chamber for imparting to the fluid from the pipe a rotary motion within the chamber around a vertical axis thereof to cause said fluid to spiral upwardly in the chamber along said cylindrical wall, the rotation of the fluid in the chamber causing the heavy impurities under centrifugal force to move outwardly to the chamber wall and up the latter to and out through the top of the chamber, said impurities dropping downwardly in the tank, and an outlet pipe extending downwardly of the tank and downwardly in the lower portion of the chamber centrally thereof for removing fluid from the chamber near the impeller and said vertical axis and out of the apparatus, whereby the fluid after moving upwardly near the chamber wall flows downwardly centrally of the chamber to said outlet pipe in the lower portion of the chamber.

15. Separating apparatus as claimed in claim 14 including a shield on the inlet pipe above the impeller and extending from said pipe outwardly towards the separating chamber wall.

16. Separating apparatus as claimed in claim 15 in which the outlet pipe terminates above the inlet pipe, and including an entrance funnel at the outlet pipe end and extending downwardly and opening above said shield.

17. Separating apparatus as claimed in claim 16 including a hood carried by the tank cover above the separating chamber and having a depending annular flange substantially aligned with the separating chamber wall.

18. Apparatus for separating from a fluid impurities of a higher specific gravity than that of the fluid, comprising a settling tank having a wall, a bottom and a cover on said wall, a separating chamber within and spaced from the wall and bottom of the tank, said chamber having a closed bottom and a substantially cylindrical wall extending upwardly from the latter bottom and terminating below the tank cover, inlet and outlet pipes extending downwardly of the tank and into the lower portion of the chamber centrally thereof and towards the chamber bottom, a pipe extending from the inlet pipe in substantially a circle approximately concentric with the chamber wall and terminating in an open end near the chamber bottom, said circular pipe being constructed and arranged to impart to fluid with impurities therein and received from the inlet pipe a rotary motion within the chamber around a vertical axis thereof, the rotation of the fluid in the chamber causing the heavy impurities under centrifugal force to move outwardly to the chamber wall and up the latter to and out through the top of the chamber, said impurities dropping downwardly in the tank, and said outlet pipe removing fluid from the chamber near the chamber bottom and said vertical axis and out of the apparatus.

19. Apparatus for separating from a fluid impurities of a higher specific gravity than that of the fluid, comprising a settling tank having a wall, a bottom and a cover on said wall, a separating chamber within and spaced from the wall and bottom of the tank, said chamber having a closed bottom and a substantially cylindrical wall extending upwardly from the latter bottom and terminating below the tank cover, inlet and outlet pipes extending downwardly of the tank and into the lower portion of the chamber centrally thereof and towards the chamber bottom, a pipe extending from the inlet pipe in substantially a circle approximately concentric with the chamber wall and terminating in an open end near the chamber bottom, said circular pipe being constructed and arranged to impart to fluid with impurities therein and received from the inlet pipe a rotary motion within the chamber around a vertical axis thereof, the rotation of the fluid in the chamber causing the heavy impurities under centrifugal force to move outwardly to the chamber wall and up the latter to and out through the top of the chamber, said impurities dropping downwardly in the tank, and another pipe extending from the outlet pipe in substantially a circle approximately concentric with the chamber wall and terminating in an open end near the chamber bottom spaced from and facing away from said first-mentioned open end.

20. Separating apparatus as claimed in claim 19 including a small tube extending from said outlet pipe down into the separating chamber centrally thereof to determine the depth of the liquid in said chamber when the apparatus is in operation.

References Cited by the Examiner

UNITED STATES PATENTS

| | | | |
|---|---|---|---|
| 926,070 | 6/09 | Matchette | 55—276 |
| 1,291,857 | 1/19 | Hankar | 210—512 |
| 1,724,041 | 8/29 | Plaisted | 55—450 |
| 2,425,110 | 8/47 | McCurdy | 210—512 |
| 2,539,019 | 1/51 | Hill | 55—459 X |
| 2,864,499 | 12/58 | Teuteberg | 210—512 X |
| 2,897,965 | 8/59 | Goodwin | 209—211 |

FOREIGN PATENTS 486,795  5/18  France.

REUBEN FRIEDMAN, *Primary Examiner.*

HERBERT L. MARTIN, *Examiner.*